(12) United States Patent
Nez et al.

(10) Patent No.: US 11,657,260 B2
(45) Date of Patent: May 23, 2023

(54) NEURAL NETWORK HARDWARE ACCELERATOR DATA PARALLELISM

(71) Applicant: Edgecortix Pte. Ltd., Singapore (SG)

(72) Inventors: Nikolay Nez, Tokyo (JP); Oleg Khavin, Tokyo (JP); Tanvir Ahmed, Tokyo (JP); Jens Huthmann, Hyogo (JP); Sakyasingha Dasgupta, Tokyo (JP)

(73) Assignee: EDGECORTIX PTE. LTD., Singapore (SG)

( * ) Notice: Subject to any disclaimer, the term of this patent is extended or adjusted under 35 U.S.C. 154(b) by 0 days.

(21) Appl. No.: 17/510,397

(22) Filed: Oct. 26, 2021

(65) Prior Publication Data

US 2023/0128600 A1    Apr. 27, 2023

(51) Int. Cl.
*G06N 3/063* (2023.01)

(52) U.S. Cl.
CPC .................... *G06N 3/063* (2013.01)

(58) Field of Classification Search
CPC .......... G06N 3/063; G06N 5/04; G06F 17/15; G06F 17/16; G06F 12/0238
See application file for complete search history.

(56) References Cited

U.S. PATENT DOCUMENTS

| | | | |
|---|---|---|---|
| 5,204,841 A | 4/1993 | Chappell et al. | |
| 10,019,668 B1* | 7/2018 | Woo | G06N 3/0427 |
| 11,144,822 B1* | 10/2021 | Nez | G06F 12/0238 |
| 2018/0075344 A1* | 3/2018 | Ma | G06N 3/088 |
| 2018/0137406 A1* | 5/2018 | Howard | G06N 3/0454 |
| 2018/0197079 A1* | 7/2018 | Dasgupta | G06N 3/049 |
| 2019/0272465 A1* | 9/2019 | Kimura | G06N 3/0481 |
| 2019/0392287 A1* | 12/2019 | Ovsiannikov | G06N 3/0454 |
| 2020/0150958 A1* | 5/2020 | Ahmed | G06N 3/0454 |
| 2020/0202198 A1* | 6/2020 | Lee | G06N 3/08 |
| 2021/0103550 A1* | 4/2021 | Appu | G06F 15/8046 |
| 2021/0209450 A1* | 7/2021 | Cassidy | G06N 5/04 |
| 2022/0067513 A1* | 3/2022 | Stevens | G06F 7/50 |

OTHER PUBLICATIONS

Zhang, Chen, et al. "Optimizing fpga-based accelerator design for deep convolutional neural networks." Proceedings of the 2015 ACM/SIGDA international symposium on field-programmable gate arrays. 2015: 161-170 (Year: 2015).*

(Continued)

*Primary Examiner* — Kamran Afshar
*Assistant Examiner* — Randall K. Baldwin
(74) *Attorney, Agent, or Firm* — Hauptman Ham, LLP

(57) ABSTRACT

Neural network hardware acceleration data parallelism is performed by an integrated circuit including a plurality of memory banks, each memory bank among the plurality of memory banks configured to store values and to transmit stored values, a plurality of computation units, each computation unit among the plurality of computation units including a processor including circuitry configured to perform a mathematical operation on an input data value and a weight value to produce a resultant data value, and a computation controller configured to cause a value transmission to be received by more than one computation unit or memory bank.

18 Claims, 12 Drawing Sheets

(56) References Cited

OTHER PUBLICATIONS

Qiu, Jiantao, et al. "Going deeper with embedded fpga platform for convolutional neural network." Proceedings of the 2016 ACM/SIGDA International Symposium on Field-Programmable Gate Arrays. 2016:26-35. (Year: 2016).*

Kang, Donghyun, et al. "A novel convolutional neural network accelerator that enables fully-pipelined execution of layers." 2019 IEEE 37th International Conference on Computer Design (ICCD). IEEE, 2019 :698-701. (Year: 2019).*

Jain, Hardik, et al. "Achieving Multi-Port Memory Performance on Single-Port Memory with Coding Techniques." 2020 3rd International Conference on Information and Computer Technologies (ICICT). IEEE, 2020: 366-375 (Year: 2020).*

Zhu, Haozhe, et al. "A communication-aware dnn accelerator on imagenet using in-memory entry-counting based algorithm-circuit-architecture co-design in 65-nm cmos." IEEE Journal on Emerging and Selected Topics in Circuits and Systems 10.3 (2020): 283-294. (Year: 2020).*

Nez, Nikolay, et al. "Dynamic Neural Accelerator for Reconfigurable & Energy-efficient Neural Network Inference." 2021 IEEE Hot Chips 33 Symposium (HCS). IEEE, Aug. 20-24, 2021: 1-21 (Year: 2021).*

Tagliavini, Giuseppe. "Optimization Techniques for Parallel Programming of Embedded Many-Core Computing Platforms." (2017): i-192 (Year: 2017).*

Boutros, Andrew, and Vaughn Betz. "FPGA architecture: Principles and progression." IEEE Circuits and Systems Magazine 21.2 (May 2021): 4-29. (Year: 2021).*

Hardik, Jain et al., "Achieving Multi-Port Memory Performance on Single-Port Memory with Coding Techniques," Jan. 27, 2020, 2020 3rd International Conference on Information and Computer Technologies, IEEE, 10pp.

* cited by examiner

NEURAL NETWORK HARDWARE ACCELERATOR DATA PARALLELISM

BACKGROUND

Real-time neural network (NN) inference is going to be ubiquitous for computer vision or speech tasks on edge devices for applications such as autonomous vehicles, robotics, smartphones, portable healthcare devices, surveillance, etc. Specialized NN inference hardware has become a mainstream way of providing power efficient inference.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
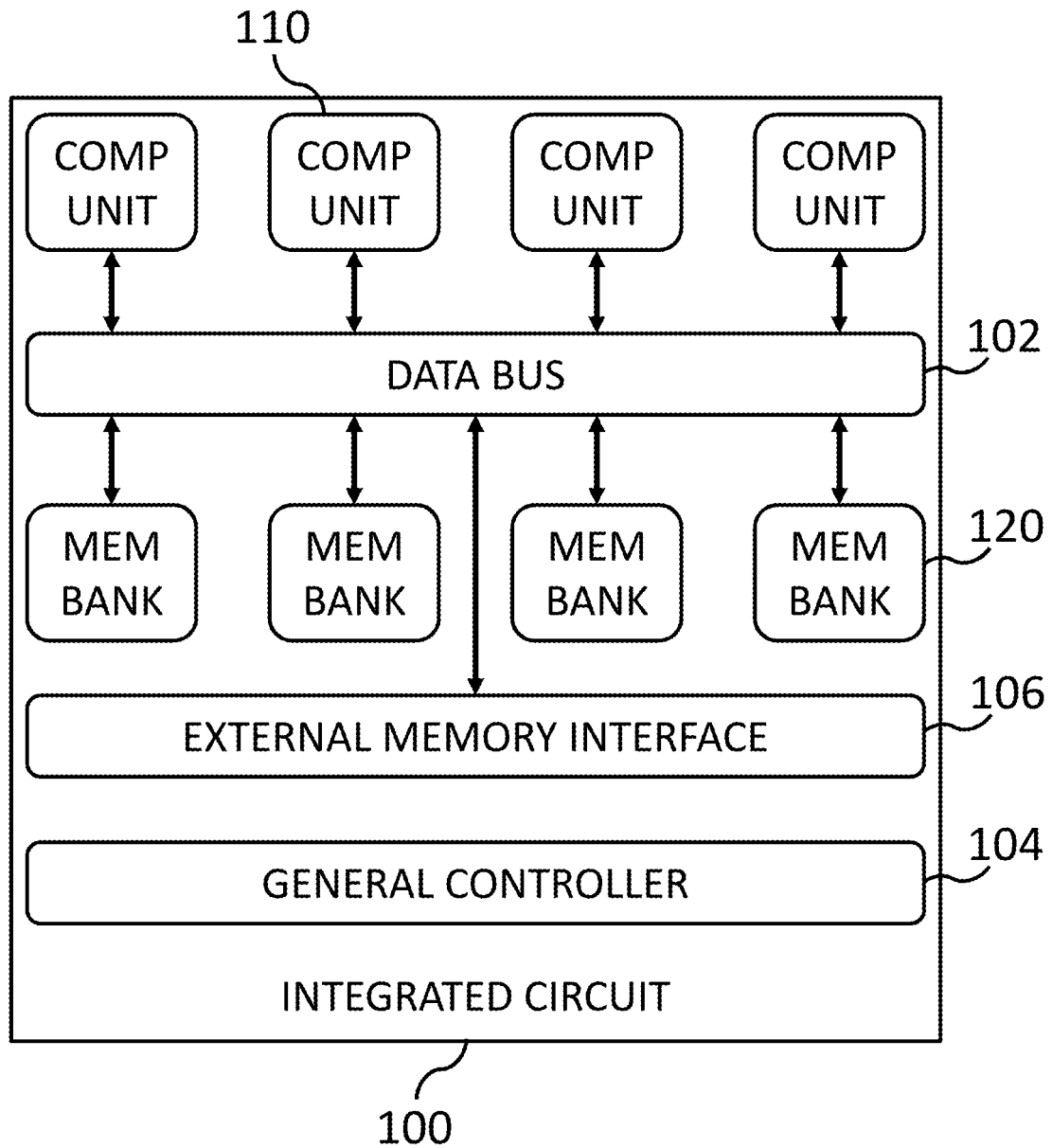
FIG. 1 is a schematic diagram of an integrated circuit for neural network hardware acceleration data parallelism, according to at least one embodiment of the present invention.

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. In addition, the present disclosure may repeat reference numerals and/or letters in the various examples. This repetition is for the purpose of simplicity and clarity and does not in itself dictate a relationship between the various embodiments and/or configurations discussed.

Some neural network hardware accelerators perform inference operations by distributing such operations among multiple processors. Such neural network hardware accelerators also include multiple memory banks to hold various values between operations. Each processor reads values from any one of the memory banks for computation, but a single memory bank is read by only one processor at a time. The processor reading a memory bank places a lock on the memory bank to prevent other processors from interacting with the memory bank and possibly corrupting data. Likewise, each processor records values resulting from computation to any of the memory banks, but a single memory bank receives values from only one processor at a time to prevent data corruption.

Inference of some types of neural networks includes performing more than one subsequent computation on a value resulting from a single computation. When performing inference on a neural network hardware accelerator having multiple processors, different processors are able to perform the subsequent operations simultaneously. However, since only one processor is able to read the value resulting from the single computation at a time, one subsequent process is delayed in comparison to the other subsequent process, because one of the processors must wait for the other processor to read the value.

In at least some embodiments herein, a neural network hardware accelerator having multiple processors and multiple memory banks is configured such that each processor is able to record a resultant value to more than one memory bank. In at least some embodiments, the neural network hardware accelerator includes an external memory interface configured to record values to more than one memory bank. In at least some embodiments, the neural network hardware accelerator is configured to perform data parallel recording of values resulting from at least some instructions. In at least some embodiments, recording each of at least some resultant values to two memory banks while performing neural network inference results in a significant decrease in the amount of time a neural network hardware accelerator needs to complete the inference task due to the reduction in waiting time of processors to read values from memory.

In at least some embodiments herein, a neural network hardware accelerator having multiple processors and multiple memory banks is configured such that each processor is able to read a value from a memory bank such that other processors are configured to receive the transmission of the value from the memory bank as the value is read. In at least some embodiments, configuring multiple processors to receive the same transmission from reading a value from a memory bank reduces the time of the multiple processors to read values individually from the same memory bank.

FIG. 1 is a schematic diagram of an integrated circuit 100 for neural network hardware acceleration data parallelism, according to at least one embodiment of the present invention. In at least some embodiments, integrated circuit 100 is a Field Programmable Gate Array (FPGA) that has been programmed as shown in FIG. 1. In at least some embodiments, integrated circuit 100 is an Application Specific Integrated Circuit (ASIC) including dedicated circuitry as shown in FIG. 1. Integrated circuit 100 includes a data bus 102, a general controller 104, an external memory interface 106, a plurality of computation units, such as computation unit 110, and a plurality of memory banks, such as memory bank 120.

Data bus 102 includes a plurality of interconnects connecting the computation units, memory banks, and external memory interface 106. In at least some embodiments, data bus 102 is configured to facilitate transmission of values from any computation unit or external memory interface 106 to any memory bank. In at least some embodiments, data bus 102 is configured to facilitate transmission of values from any memory bank to any computation unit or external memory interface 106. In at least some embodiments, data bus 102 includes passive interconnects.

In at least some embodiments, integrated circuit 100 includes a controller, such as general controller 104, configured to receive instructions to perform neural network inference. General controller 104 includes circuitry configured to execute instructions to cause integrated circuit 100 to perform neural network inference. In at least some embodiments, general controller 104 is configured to receive compiled instructions from a host processor. In at least some embodiments, the compiled instructions include a schedule of operations, designated computation units for performing each operation, designated memory banks and addresses for storing intermediate data, and any other details required for integrated circuit to perform neural network inference.

External memory interface 106 includes circuitry configured to allow the memory banks and computation units to exchange data with an external memory. In at least some embodiments, the external memory is a DRAM memory in communication with a host processor. In at least some embodiments, integrated circuit 100 stores a small working portion of the data for neural network inference while the DRAM memory stores the rest of the data.

The computation units, such as computation unit 110, include circuitry configured to perform mathematical operations on the input values stored and the weight values stored in the memory banks. In at least some embodiments, the computation units output partial sums to the memory banks. In at least some embodiments, the computation units perform accumulation with existing partial sums stored in the memory banks. In at least some embodiments, the computation units include at least one processor configured to perform depth-wise convolution or point-wise convolution. In at least some embodiments, the computation units include generic convolution processors, which support combinations of depth-wise convolution and point-wise convolution layers, such as Inverted Residual Blocks in MobileNet architectures. In at least some embodiments, the computation units include processors configured to perform other operations for inference of deep networks, or any other type of neural network. In at least some embodiments, integrated circuit 100 includes a plurality of computation units, each computation unit among the plurality of computation units including a processor including circuitry configured to perform a mathematical operation on an input data value and a weight value to produce a resultant data value, and a computation controller. In at least some embodiments, the computation units are configured as shown in FIG. 2, which will be described hereinafter.

The memory banks, such as memory bank 120, include circuitry configured to store data. In at least some embodiments, the memory banks include volatile data storage. In at least some embodiments, integrated circuit 100 includes a plurality of memory banks, each memory bank among the plurality of memory banks configured to store values and to transmit stored values. In at least some embodiments, the memory banks are configured as shown in FIG. 2, which will be described hereinafter.

Figure 2:
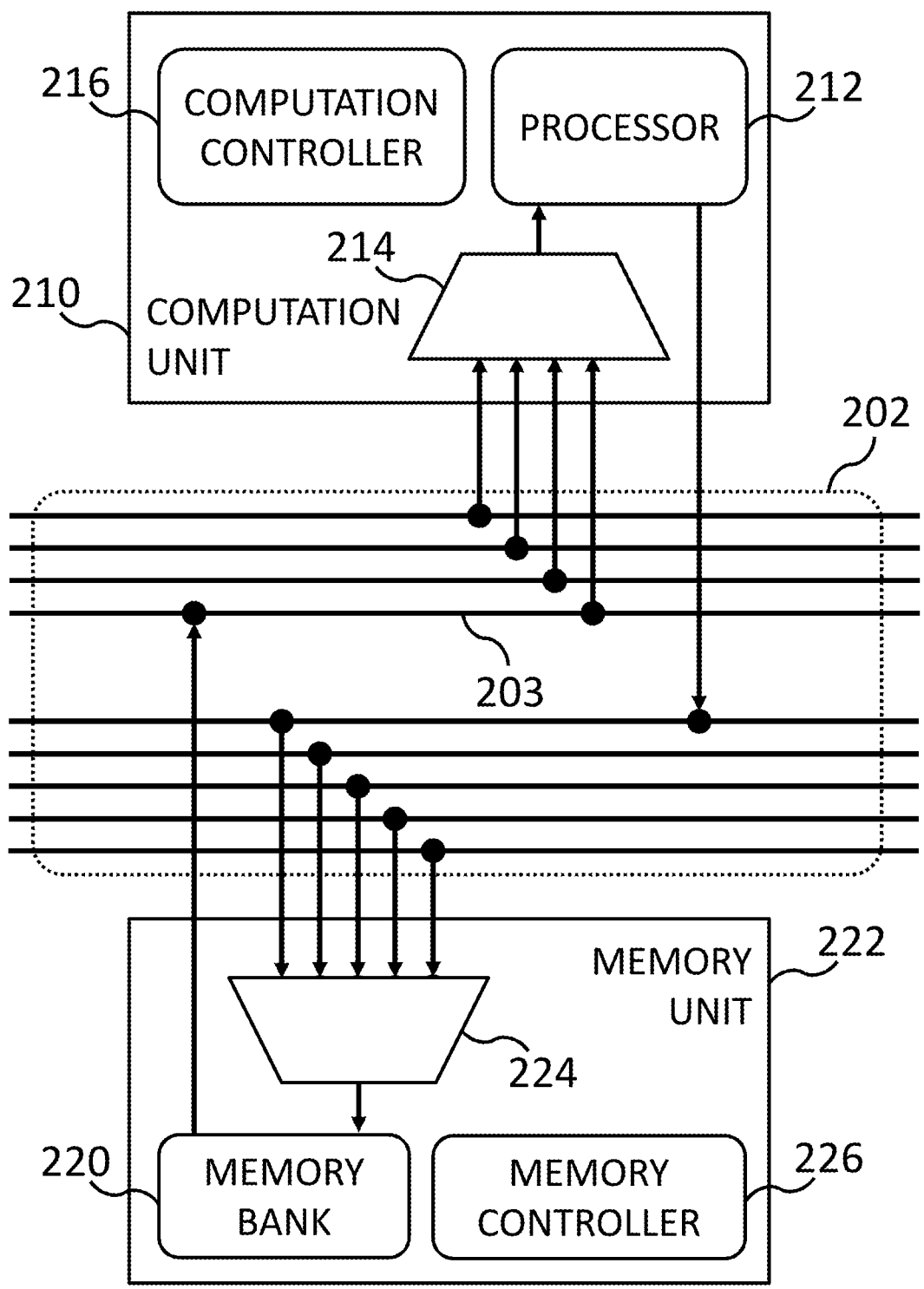
FIG. 2 is a schematic diagram of computation unit and memory bank interconnection in an integrated circuit for neural network hardware acceleration data parallelism, according to at least one embodiment of the present invention.

FIG. 2 is a schematic diagram of computation unit and memory bank interconnection in an integrated circuit for neural network hardware acceleration data parallelism, according to at least one embodiment of the present invention. FIG. 2 shows a computation unit 210 and a memory unit 222 connected through a data bus 202.

Computation unit 210 includes a processor 212, a multiplexer 214, and a computation controller 216. In at least some embodiments, processor 212 includes circuitry configured to perform mathematical operations. In at least some embodiments, processor 212 is configured to perform convolution operations, such as point-wise convolution or depth-wise convolution. In at least some embodiments, processor 212 is configured to perform point-wise convolution or depth-wise convolution. In at least some embodiments, processor 212 is configured to provide direct support for different parameters of mathematical operations, such as a kernel size of height (KH)×width (KW), vertical and horizontal strides, dilation, padding, etc. Processor 212 includes a data input connected to data bus 202 through multiplexer 214, and includes a data output connected to data bus 202.

Multiplexer 214 includes a plurality of inputs from data bus 202 and a single output to processor 212. In at least some embodiments, multiplexer 214 is configured to select a data input connection to processor 212 from data bus 202. In at least some embodiments, multiplexer 214 is configured to respond to selection instructions, such as signals, from computation controller 216. In at least some embodiments, multiplexer 214 includes an input from data bus 202 for each memory bank in the integrated circuit. In at least some embodiments, each computation unit includes a computation multiplexer configurable to connect to one of the plurality of memory banks. In at least some embodiments, each memory bank among the plurality of memory banks is configured to store values received through a corresponding bank multiplexer.

Computation controller 216 includes circuitry configured to cause computation unit 210 to operate. In at least some embodiments, computation controller 216 is configured to receive signals from a general controller of the integrated circuit, and cause computation unit 210 to operate in accordance with the received signals. In at least some embodiments, computation controller 216 causes multiplexer 214 to connect processor 212 to a specific memory bank, causes processor 212 to read one or more values from the connected memory bank, causes processor 212 to perform a mathematical operation on the one or more values, and then cause processor 212 to record a resultant value to one or more memory banks. In at least some embodiments, computation controller 216 is configured to receive the input data value from any of the plurality of memory banks, receive the weight value from any of the plurality of memory banks, cause the processor to perform the mathematical operation, and transmit the resultant data value to at least two memory banks among the plurality of memory banks, such that a single transmission of the resultant data value is received by the at least two memory banks at a substantially similar time. In at least some embodiments, computation controller 216 is further configured to set a lock on each of the at least two memory banks. In at least some embodiments, computation controller 216 is further configured to apply a bank offset for one or more of the at least two memory banks. In at least some embodiments, computation controller 216 is further configured to apply a bank offset for one or more of the at least two memory banks. In at least some embodiments, computation controller 216 is further configured to release the lock on each of the at least two memory banks. In at least some embodiments, computation controller 216 is further configured to synchronize a second computation unit among the plurality of computation units to receive one of the input data value or the weight value, and read the one of the input data value or the weight value from the memory bank storing the one of the input data value or the weight value among the plurality of memory banks, such that the memory bank storing the one of the input data value or the weight value makes a single transmission of the one of the input data value or the weight value to be read by the computation controller and the second computation unit at a substantially similar time.

Memory unit 222 includes memory bank 220, multiplexer 224, and memory controller 226. In at least some embodiments, memory bank 220 has substantially the same structure and performs substantially the same functions as memory bank 120 of FIG. 1, except where the following description differs. Multiplexer 224 includes a plurality of inputs from data bus 202 and a single output to memory bank 220. In at least some embodiments, multiplexer 224 is configured to select a data input connection to memory bank 220 from data bus 202. In at least some embodiments, multiplexer 224 is configured to respond to selection instructions, such as signals, from memory controller 226. In at least some embodiments, multiplexer 224 includes an input from data bus 202 for an external memory interface and each computation unit in the integrated circuit. In at least some embodiments, each bank multiplexer 224 is configurable to connect to one of a computation unit among the plurality of computation units or an external memory.

Memory controller 226 includes circuitry configured to cause memory unit 222 to operate. In at least some embodiments, memory controller 226 is configured to receive signals from a general controller of the integrated circuit, and cause memory unit 222 to operate in accordance with the received signals. In at least some embodiments, memory controller 226 locks memory bank 220 in response to signals received from a computation unit, and causes memory bank 220 to transmit recorded values to one or more computation units. In at least some embodiments, memory controller 226 causes multiplexer 224 to connect memory bank 220 to a specific computation unit, and causes memory bank 220 to record one or more values transmitted from the connected computation unit.

Data bus 202 has substantially the same structure and performs substantially the same function as data bus 102 of FIG. 1, except where the following description differs. Data bus 202 includes a plurality of interconnects, such as interconnect 203, connecting the computation units, memory banks, and an external memory interface. Interconnect 203 connects memory bank 220 to multiplexer 214. In at least some embodiments, interconnect 203 is a portion of a line that connects memory bank 220 to the multiplexers of all other computation units in the integrated circuit.

Figure 3:
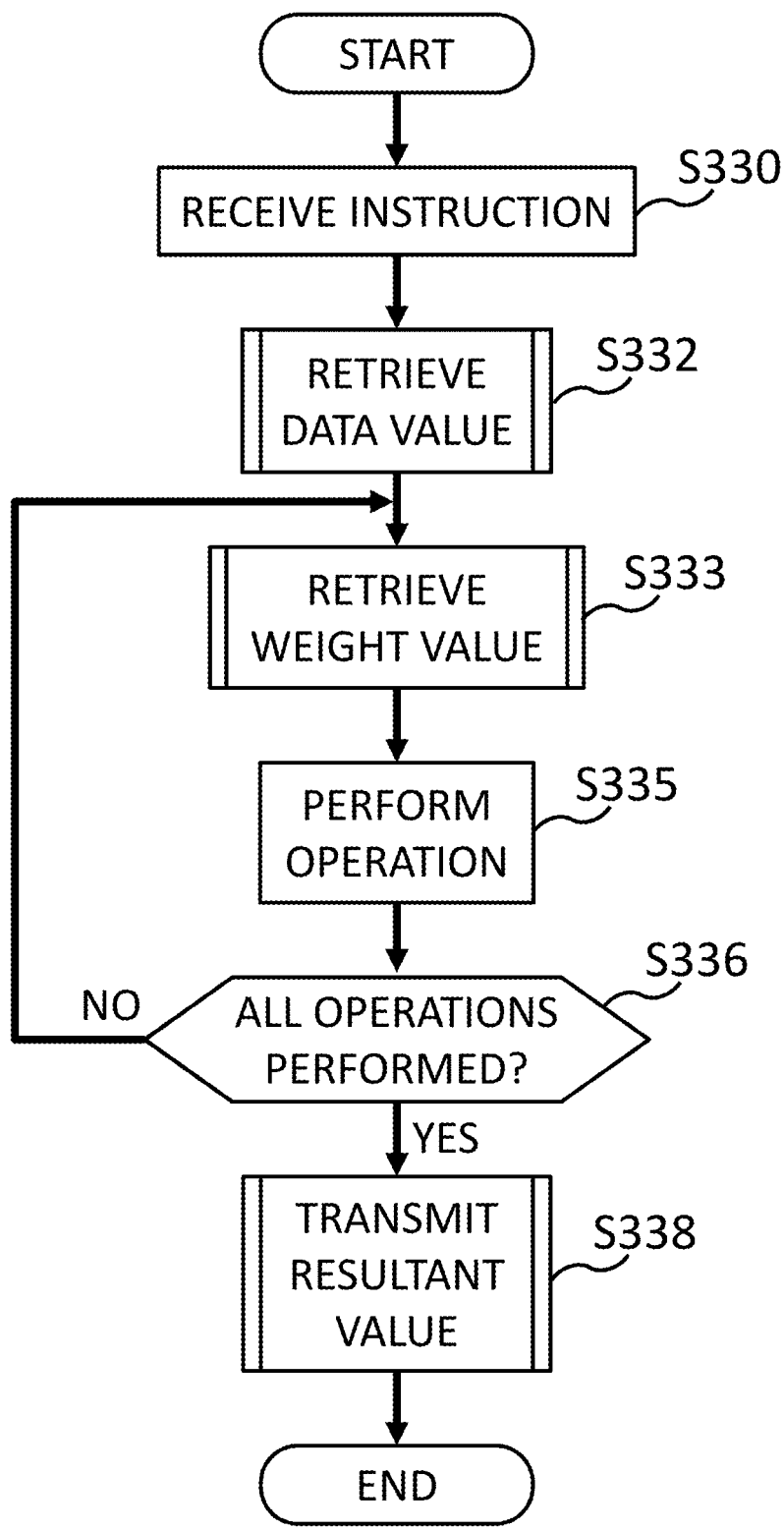
FIG. 3 is an operational flow for an operational flow for neural network hardware accelerated inference, according to at least one embodiment of the present invention.

FIG. 3 is an operational flow for an operational flow for neural network hardware accelerated inference, according to at least one embodiment of the present invention. The operational flow may provide a method for neural network hardware acceleration data parallelism. In at least some embodiments, the method is performed by a controller including sections for performing certain operations, such as computation controller 216 shown in FIG. 2 or general controller 104 shown in FIG. 1.

At S330, a receiving section receives an instruction to perform a mathematical operation on values. In at least some embodiments, the instruction includes a location of each value, each location identified by a memory bank identifier, and an address within the memory bank. In at least some embodiments, the instruction indicates one or more mathematical operations to perform. In at least some embodiments, the instruction includes one or more locations to record a resulting value, each location identified by a memory bank identifier, and an address within the memory bank. In at least some embodiments, the receiving section receives, by the integrated circuit, an instruction to perform inference of a neural network. In at least some embodiments, the instruction to perform inference includes multiple instructions to perform mathematical operations. In at least some embodiments, the receiving section receives, by the computation unit, an instruction from the general controller based on the instruction to perform inference.

At S332, a retrieving section or a sub-section thereof retrieves a data value. In at least some embodiments, the retrieving section retrieves the data value from the one or more memory banks through a data bus. In at least some embodiments, the retrieving section selects an input of a multiplexer to connect to the memory bank storing the data value. In at least some embodiments, the retrieving section retrieves, by a first computation unit among a plurality of computation units included in an integrated circuit configured to perform neural network inference, an input data value from a memory bank storing the input data value among a plurality of memory banks included in the integrated circuit. In at least some embodiments, the retrieving section configures a first multiplexer corresponding to the first computation unit to connect to the memory bank storing the input data value. In at least some embodiments, the data value retrieval process is performed as described hereinafter with respect to FIG. 8.

At S333, the retrieving section or a sub-section thereof retrieves a weight value. In at least some embodiments, the retrieving section retrieves the weight value from the one or more memory banks through a data bus. In at least some embodiments, the retrieving section selects an input of a multiplexer to connect to the memory bank storing the weight value. In at least some embodiments, the retrieving section retrieves, by the first computation unit, a weight value from a memory bank storing the weight value among the plurality of memory banks. In at least some embodiments, the retrieving section configures the first multiplexer to connect to the one memory bank storing the weight value. In at least some embodiments, the weight value retrieval process is performed as described hereinafter with respect to FIG. 8.

At S335, an operating section or a sub-section thereof performs a mathematical operation. In at least some embodiments, the operating section performs the mathematical operation on the data value retrieved at S332 and the weight value retrieved at S333. In at least some embodiments, the operating section causes a processor, such as processor 212 in FIG. 2, to perform the mathematical operation. In at least some embodiments, the operating section performs, by the first computation unit, a mathematical operation on the input data value and the weight value to produce a resultant data value. In at least some embodiments, the operating section performs the mathematical operation on the resultant data value of a preceding iteration of the operation at S335 and the weight value retrieved at S333.

At S336, the controller or a sub-section thereof determines whether all operations in the instruction received at S330 have been performed. In at least some embodiments, the resultant value of the operation at S335 is subject to a further operation before being recorded to a memory bank. If the controller determines that the instruction includes a further operation, then the operational flow returns to weight value retrieval at S333. If the controller determines that all operations in the instruction have been performed, then the operational flow proceeds to resultant value transmission at S338.

At S338, a transmitting section or a sub-section thereof transmits the resultant value to one or more memory banks. In at least some embodiments, the transmitting section transmits the resultant value through a data bus to the one or more memory banks. In at least some embodiments, the transmitting section causes the computation unit to transmit the resultant value. In at least some embodiments, the transmitting section instructs a multiplexer of each corresponding memory unit of the one or more memory banks to connect to the computation unit for recording. In at least some embodiments, the resultant value transmission process is performed as described hereinafter with respect to FIG. 4.

Figure 4:
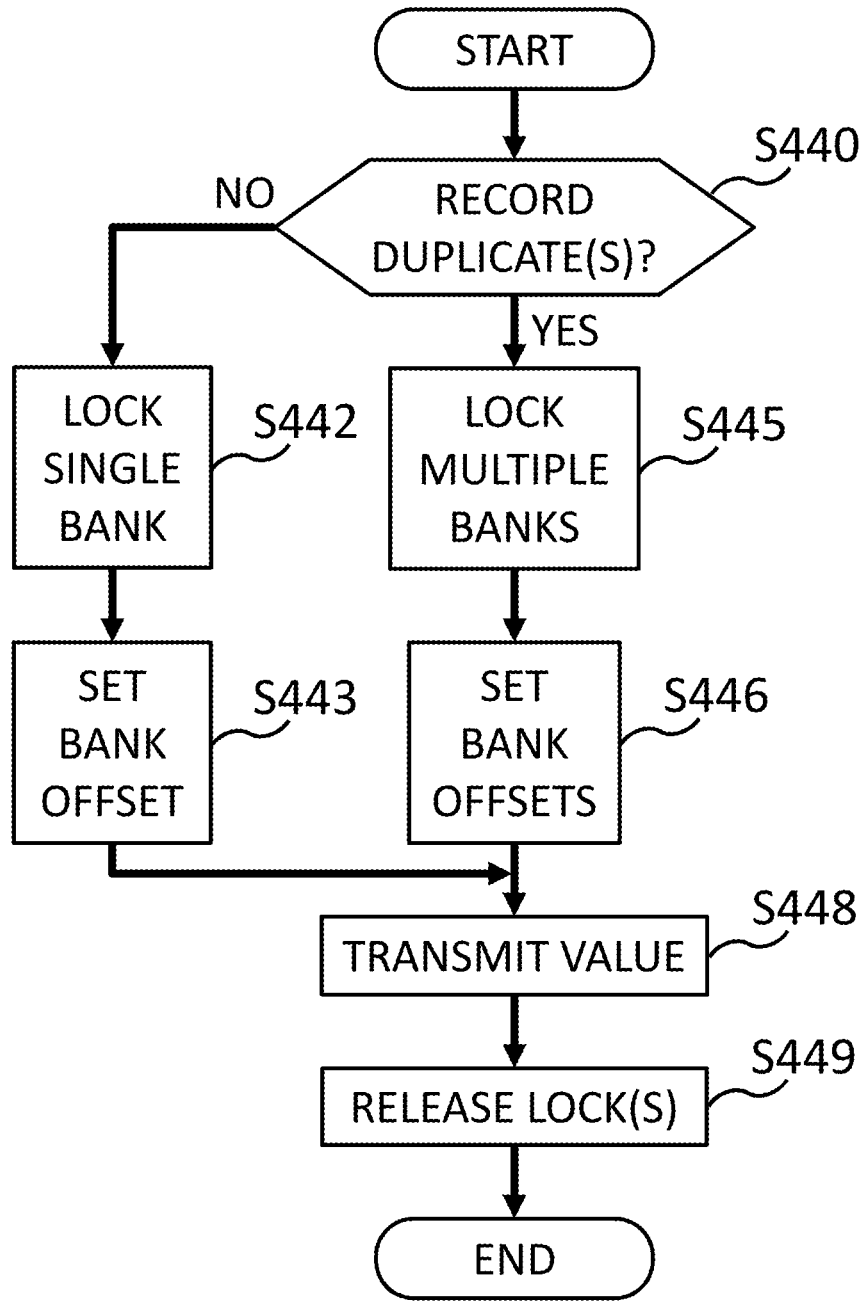
FIG. 4 is an operational flow for resultant value transmission, according to at least one embodiment of the present invention.

FIG. 4 is an operational flow for resultant value transmission, according to at least one embodiment of the present invention. The operational flow may provide a method for transmitting a resultant value, such as the operation performed at S338 in FIG. 3. In at least some embodiments, the method is performed by a transmitting section of a controller, such as computation controller 216 shown in FIG. 2 or general controller 104 shown in FIG. 1.

At S440, the transmitting section or a sub-section thereof determines whether the transmission involves recording one or more duplicates of the resultant value. In at least some embodiments, the instruction received by the controller indicates more than one memory location for transmissions involving duplicate recording. If the controller determines that the transmission does not involve duplicate recording, then the operational flow proceeds to single bank locking at S442. If the controller determines that the transmission involves duplicate recording, then the operational flow proceeds to multiple bank locking at S445.

At S442, the transmitting section or a sub-section thereof locks the single memory bank to which the resultant value is to be recorded. In at least some embodiments, the transmitting section sets a lock on the single memory bank. In at least some embodiments, the transmitting section instructs a memory controller of the corresponding memory unit to lock the memory bank for recording from the computation unit.

At S443, the transmitting section or a sub-section thereof sets a bank offset to the single memory bank to which the resultant value is to be recorded. In at least some embodiments, the transmitting section applies a bank offset for the single memory bank. In at least some embodiments, the instruction includes one or more bank offsets, each bank offset corresponding to a memory bank in the integrated circuit. In response to the single memory bank being associated with a bank offset in the instruction, the transmitting section adjusts the address within the memory bank based on the bank offset, in at least some embodiments, so that the resultant value is recorded to the designated address.

At S445, the transmitting section or a sub-section thereof locks multiple memory banks to which the resultant value is to be recorded. In at least some embodiments, the transmitting section sets a lock on each of the at least two memory banks. In at least some embodiments, the transmitting section instructs a memory controller of each corresponding memory unit to lock the memory banks for recording from the computation unit.

At S446, the transmitting section or a sub-section thereof sets a bank offset to multiple memory banks to which the resultant value is to be recorded. In at least some embodiments, the transmitting section applies a bank offset for one or more of the at least two memory banks. In at least some embodiments, the instruction includes one or more bank offsets, each bank offset corresponding to a memory bank in the integrated circuit. In response to one or more of the memory banks being associated with a bank offset in the instruction, the transmitting section adjusts the address within those memory banks based on the associated bank offset, in at least some embodiments, so that the resultant value is recorded to the designated addresses.

At S448, the transmitting section or a sub-section thereof transmits the resultant value to the one or more banks locked to receive the resultant value at S442 or S445. In at least some embodiments, the transmitting section causes the computation unit to transmit the resultant value. In at least some embodiments, the transmitting section transmits, by the first computation unit, the resultant data value to at least two memory banks among the plurality of memory banks, such that the first computation unit makes a single transmission of the resultant data value, which is received by the at least two memory banks at a substantially similar time. In at least some embodiments, the transmitting section transmits, by the first computation unit, the resultant data value to the single memory bank.

At S449, the transmitting section or a sub-section thereof releases the locks of the one or more banks locked at S442 or S445. In at least some embodiments, the transmitting section instructs a memory controller of each corresponding memory unit to release the lock of the memory banks. In at least some embodiments, the transmitting section releases the lock on each of the at least two memory banks.

Figure 5:
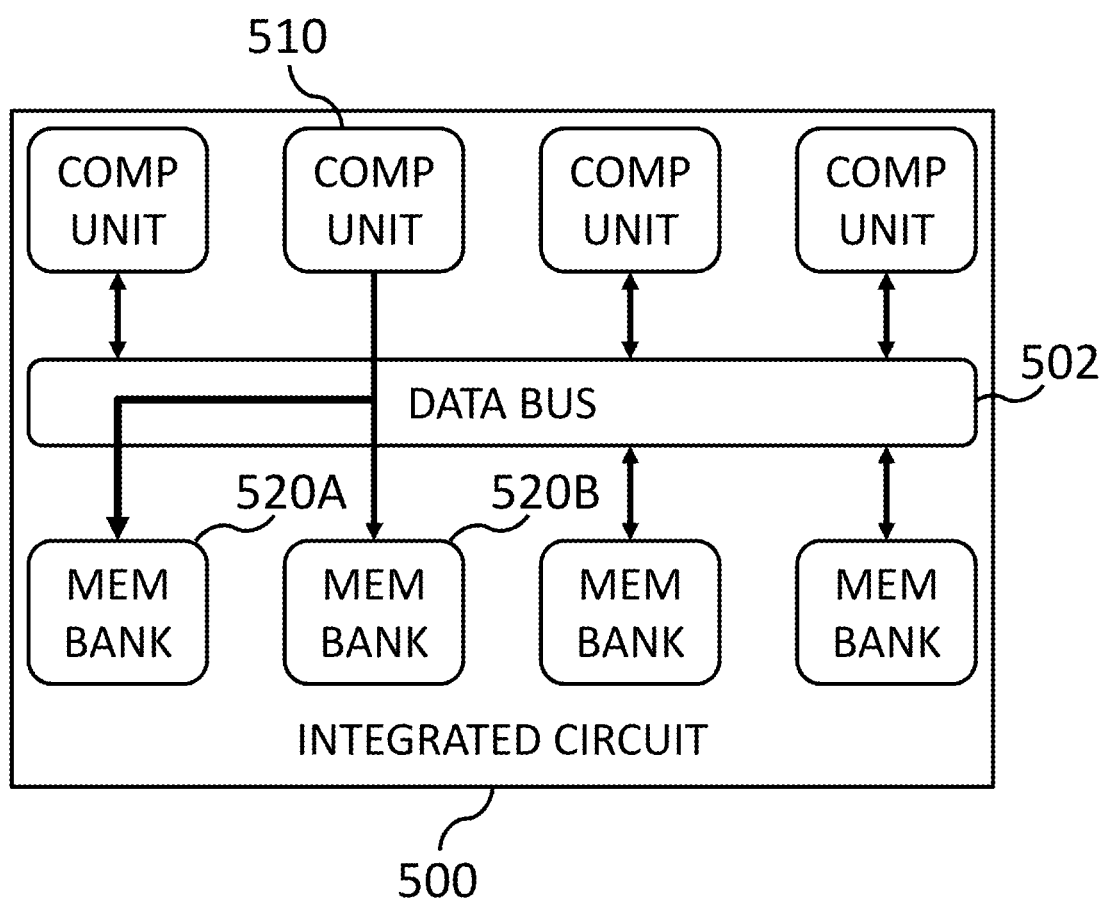
FIG. 5 is a schematic diagram of computation unit and memory bank interconnection during data parallel recording, according to at least one embodiment of the present invention.

FIG. 5 is a schematic diagram of computation unit and memory bank interconnection during data parallel recording, according to at least one embodiment of the present invention. The diagram includes an integrated circuit 500 including a data bus 502, a computation unit 510, a memory bank 520A, and a memory bank 520B. Data bus 502, computation unit 510, and memory banks 520A and 520B have substantially the same structure and perform substantially the same function as data bus 102, computation unit 110, and memory bank 120 of FIG. 1, respectively, except where the description differs below.

During data parallel recording a resultant value is transmitted to multiple memory banks, such as in the operation at S448 of FIG. 4 where multiple memory banks are designated to have the resultant value recorded thereon. In at least some embodiments in which, during inference, computation unit 510 is instructed to record a resultant value to memory bank 520A and memory bank 520B, a transmitting section instructs a multiplexer of each corresponding memory unit of memory bank 520A and memory bank 520B to connect to computation unit 510 for recording. In at least some embodiments, the interconnection through data bus 502 shown in FIG. 5 routes output from computation unit 510 to memory bank 520A and memory bank 520B. Therefore, a single transmission from computation unit 510 is received by both memory bank 520A and memory bank 520B. In at least some embodiments, a transmission is received by memory bank 520A at a substantially similar time as the same transmission is received by memory bank 520B. In at least some embodiments, a difference in time of reception of the same transmission between memory bank 520A and memory bank 520B is attributable to a difference in physical distance between computation unit 510 and the respective memory bank. In at least some embodiments, the difference in time of reception is negligible. In at least some embodiments, errors in reception of the transmission due to the difference in time of reception are resolved by reducing clock time of the integrated circuit.

Figure 6:
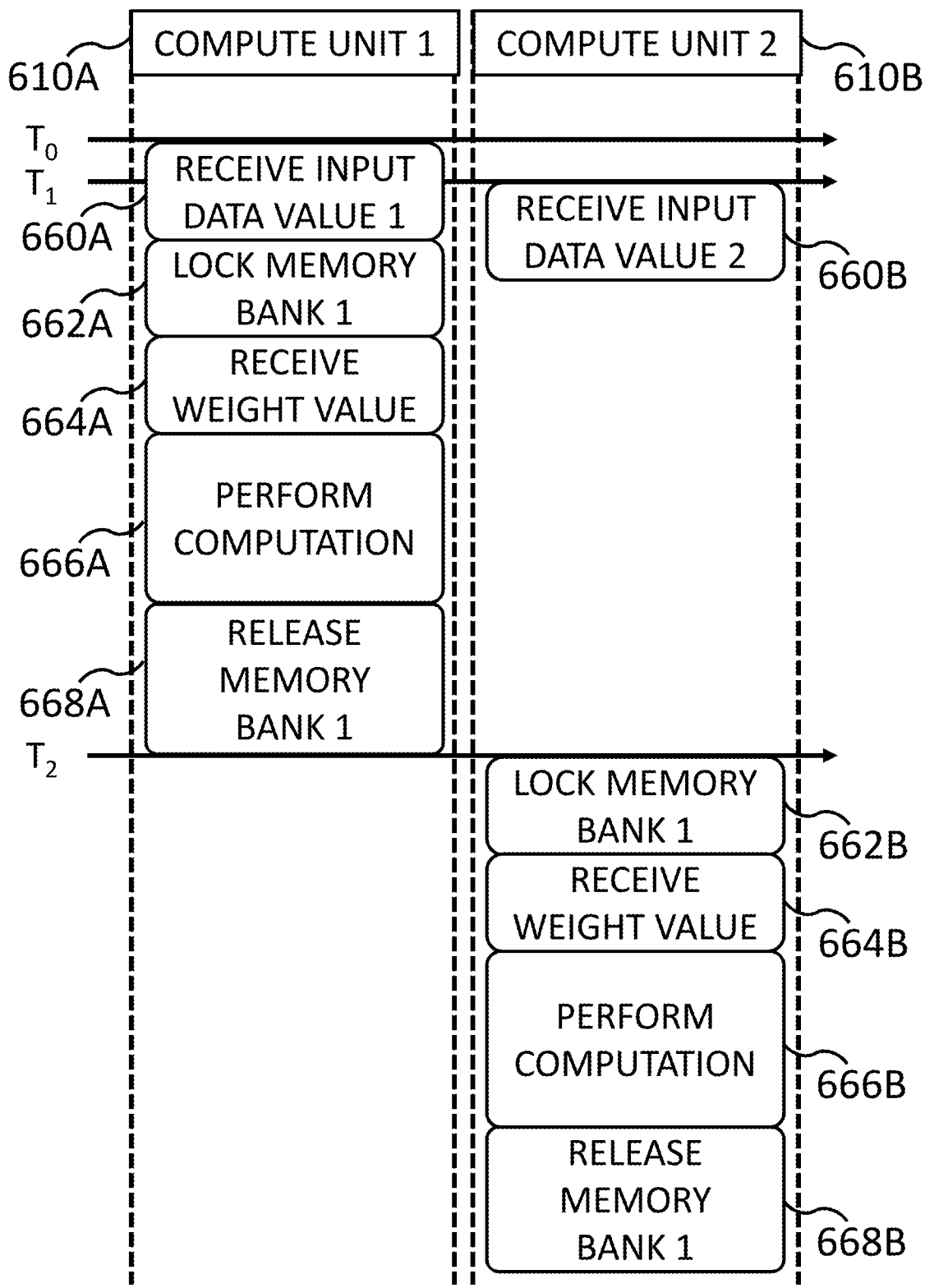
FIG. 6 is a graph of computation unit operations and time while reading from a common memory bank, according to at least one embodiment of the present invention.

FIG. 6 is a graph of computation unit operations and time while reading from a common memory bank, according to at least one embodiment of the present invention. The horizontal axis represents compute units while the vertical axis represents time.

At $T_0$, a first computation unit 610A begins performing a series of operations including 660A, 662A, 664A, 666A, and 668A. At 660A, first compute unit 610A receives a first input data value from a memory bank storing the first input data value. At 662A, first compute unit 610A locks a first memory bank storing a weight value. At 664A, first compute unit 610A receives the weight value from the first memory bank. At 666A, first compute unit 610A performs a computation on the first input data value and the weight value. At 668A, first compute unit 610A releases the first memory bank. At $T_2$, the series of operations performed by the first compute unit 610A is complete.

At $T_1$, a second compute unit 610B begins performing a series of operations including 660B, 662B, 664B, 666B, and 668B. At 660B, second compute unit 610B receives a second input data value from a memory bank storing the second input data value. In at least some embodiments, the operations at 660A and 660B are performed simultaneously, i.e.—$T_0=T_1$. In at least some embodiments, there is a delay between performance of the operation at 660A and performance of the operation at 660B. In at least some embodiments, once second compute unit 610B has received the second input data value from the memory bank storing the second input data value, second compute unit 610B then moves to retrieve the weight value. However, while the first memory bank storing the weight value is locked to first compute unit 610A, second compute unit 610B cannot retrieve the weight value from the first memory bank. In at least some embodiments, second compute unit 610B waits until first compute unit 610A releases the lock on the first memory bank to retrieve the weight value from the first memory bank.

At $T_2$, second computation unit 610B continues performing the series of operations with 662B. At 662B, second compute unit 610B locks the first memory bank. At 664B, second compute unit 610B receives the weight value from the first memory bank. At 666B, second compute unit 610B performs a computation on the second input data value and the weight value. At 668B, second compute unit 610B releases the first memory bank. In at least some embodiments in which two compute units perform an operation on the same value stored in the same memory bank, the total amount of time used is almost twice the amount of time that one compute unit uses to perform the operation.

Figure 7:
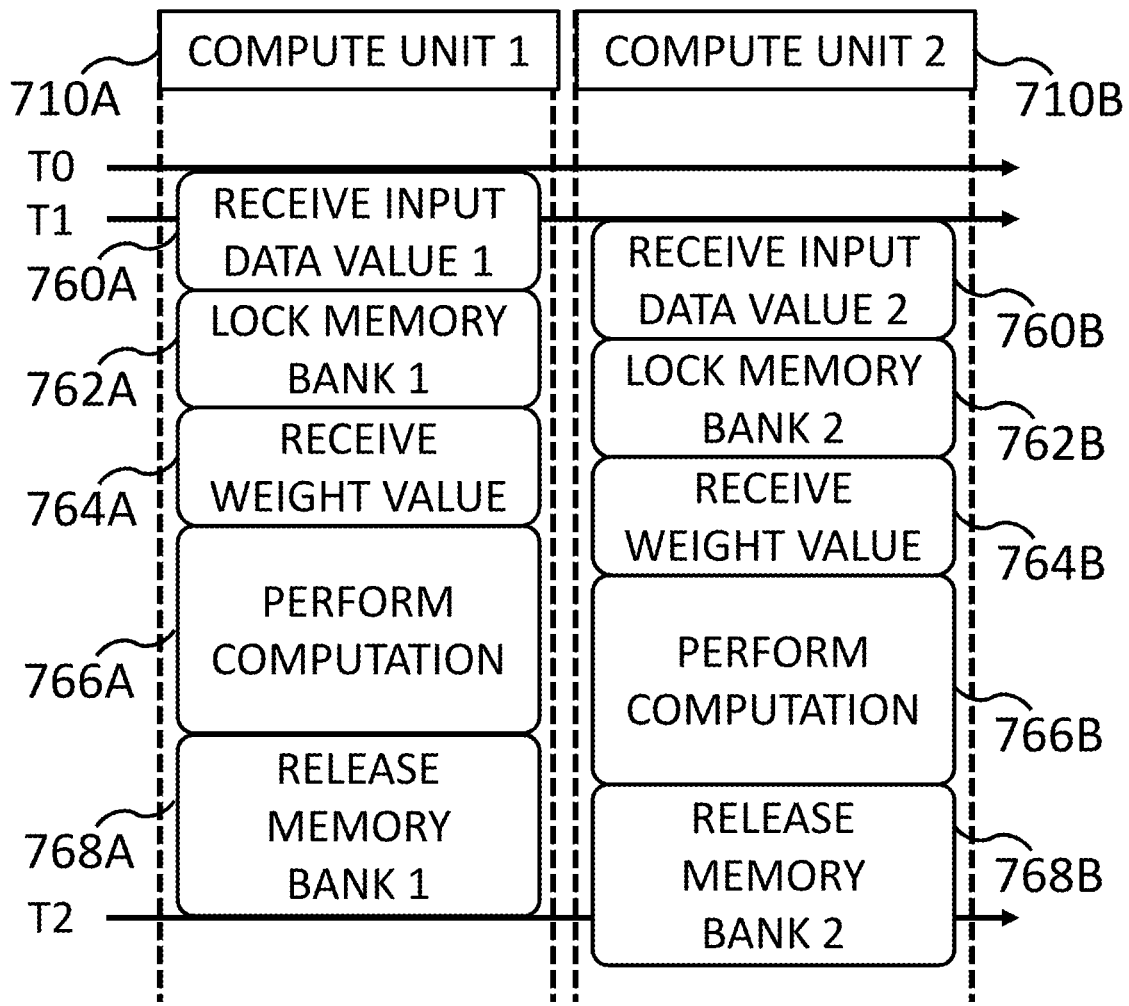
FIG. 7 is a graph of computation unit operations and time while reading from separate memory banks, according to at least one embodiment of the present invention.

FIG. 7 is a graph of computation unit operations and time while reading from separate memory banks, according to at least one embodiment of the present invention. The horizontal axis represents compute units while the vertical axis represents time.

At $T_0$, a first computation unit 710A begins performing a series of operations including 760A, 762A, 764A, 766A, and 768A. At 760A, first compute unit 710A receives a first input data value from a memory bank storing the first input data value. At 762A, first compute unit 710A locks a first memory bank storing a weight value. At 764A, first compute unit 710A receives the weight value from the first memory bank. At 766A, first compute unit 710A performs a computation on the first input data value and the weight value. At 768A, first compute unit 710A releases the first memory bank. At $T_2$, the series of operations performed by the first compute unit 710A is complete.

At $T_1$, a second compute unit 710B begins performing a series of operations including 760B, 762B, 764B, 766B, and 768B. At 760B, second compute unit 710B receives a second input data value from a memory bank storing the second input data value. In at least some embodiments, the operations at 760A and 760B are performed simultaneously, i.e.—$T_0=T_1$. In at least some embodiments, there is a delay between performance of the operation at 760A and performance of the operation at 760B. In at least some embodiments, once second compute unit 710B has received the second input data value from the memory bank storing the second input data value, second compute unit 710B then moves to retrieve the weight value. In at least some embodiments, although the first memory bank storing the weight value is locked to first compute unit 710A, second compute unit 710B retrieves the weight value from a second memory bank without waiting until first compute unit 710A releases the lock on the first memory bank.

At 762B, second compute unit 710B locks the second memory bank. At 764B, second compute unit 710B receives the weight value from the second memory bank. At 766B, second compute unit 710B performs a computation on the second input data value and the weight value. At 768B, second compute unit 710B releases the second memory bank. In at least some embodiments in which two compute units perform an operation on the same value stored in separate memory banks, the total amount of time used is little or no more than the amount of time that one compute unit uses to perform the operation. In at least some embodiments, data parallel recording in which a resultant value is transmitted to multiple memory banks, such as in the operation at S448 of FIG. 4 where multiple memory banks are designated to have the resultant value recorded thereon, enables two compute units to perform an operation on the same value stored in separate memory banks, thus reducing the overall time used by an integrated circuit to complete neural network inference. In at least some embodiments, data parallelism reduces dark silicon.

Figure 8:
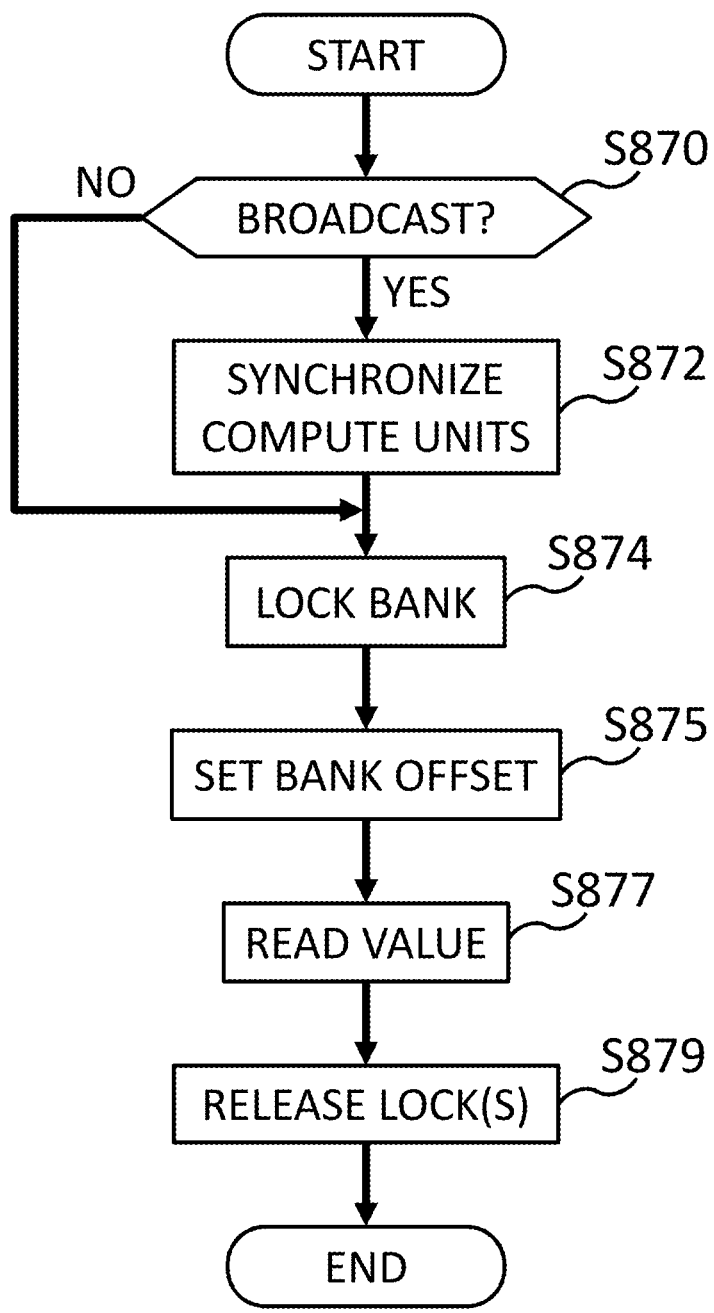
FIG. 8 is an operational flow for value retrieval, according to at least one embodiment of the present invention.

FIG. 8 is an operational flow for value retrieval, according to at least one embodiment of the present invention. The operational flow may provide a method for retrieving a value, such as the operation performed at S332 or S333 in FIG. 3. In at least some embodiments, the method is performed by a retrieving section of a controller, such as computation controller 216 shown in FIG. 2 or general controller 104 shown in FIG. 1.

At S870, the retrieving section or a sub-section thereof determines whether the retrieval involves broadcasting such that a secondary computation unit can read the transmission from the memory bank caused by the primary computation unit retrieving the value from the memory bank. In at least some embodiments, the instruction received by the controller indicates more than one computation unit for retrievals involving duplicate reading. If the controller determines that the transmission does not involve duplicate reading, then the operational flow proceeds to bank locking at S874. If the controller determines that the transmission involves duplicate reading, then the operational flow proceeds to compute unit synchronization at S872.

At S872, the retrieving section or a sub-section thereof synchronizes computation units. In at least some embodiments, the retrieving section synchronizes the secondary computation unit with the primary computation unit. In at least some embodiments, the retrieving section synchronizes a second computation unit to read one of the input data value and the weight value. In at least some embodiments, the retrieving section instructs the secondary computation unit to prepare for reading the value. In at least some embodiments, the retrieving section applies a timing offset for the secondary computation unit where the physical distance of the secondary computation unit from the memory bank is significantly different from the physical distance of the primary computation unit from the memory bank.

At S874, the retrieving section or a sub-section thereof locks the memory bank from which the value is to be read. In at least some embodiments, the retrieving section sets a lock on the memory bank with respect to both the primary computation unit and the secondary computation unit. In at least some embodiments, the transmitting section instructs a memory controller of the corresponding memory unit to lock the memory bank for value retrieval by both the primary computation unit and the secondary computation unit.

At S875, the retrieving section or a sub-section thereof sets a bank offset to the memory bank from which the value is to be read. In at least some embodiments, the retrieving section applies a bank offset for the memory bank. In at least some embodiments, the instruction includes one or more bank offsets, each bank offset corresponding to a memory bank in the integrated circuit. In response to the memory bank being associated with a bank offset in the instruction, the retrieving section adjusts the address within the memory bank based on the bank offset, in at least some embodiments, so that the value is read from the designated address.

At S877, the retrieving section or a sub-section thereof reads the value from the memory bank. In at least some embodiments, the retrieving section causes the primary computation unit to read the value from the memory bank. In at least some embodiments, the retrieving section reads, by the first computation unit, the one of the input data value or the weight value from the memory bank storing the one of the input data value or the weight value among the plurality of memory banks, such that the memory bank storing the one of the input data value or the weight value makes a single transmission of the one of the input data value or the weight value, which is read by the first computation unit and the second computation unit at a substantially similar time.

At S879, the retrieving section or a sub-section thereof releases the lock of the memory bank locked at S874. In at least some embodiments, the retrieving section instructs a memory controller of the corresponding memory unit to release the lock of the memory bank. In at least some embodiments, the retrieving section releases the lock on the memory bank.

Figure 9:
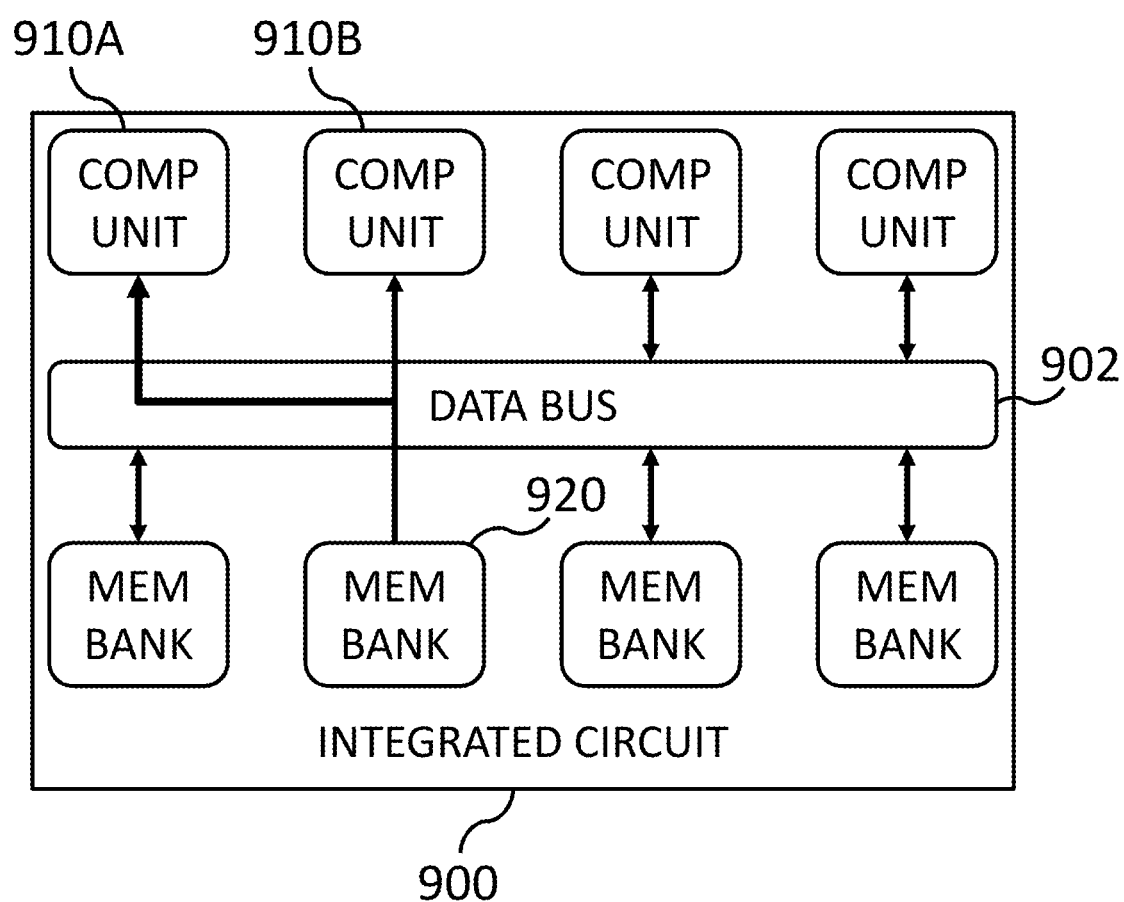
FIG. 9 is a schematic diagram of computation unit and memory bank interconnection during data parallel reading, according to at least one embodiment of the present invention.

FIG. 9 is a schematic diagram of computation unit and memory bank interconnection during data parallel reading, according to at least one embodiment of the present invention. The diagram includes an integrated circuit 900 including a data bus 902, a computation unit 910A, a computation unit 910B, and a memory bank 920. Data bus 902, computation units 910A and 910B, and memory bank 920 have substantially the same structure and perform substantially the same function as data bus 102, computation unit 110, and memory bank 120 of FIG. 1, respectively, except where the description differs below.

During a data parallel reading process a value is read from a single memory bank from multiple computation units, such as in the operation at S877 of FIG. 8 where multiple computation units are designated to read the value. In at least some embodiments in which, during inference, computation unit 910A is instructed to synchronize computation unit 910B to receive transmission of a value from memory bank 920 as the value is read by computation unit 910A, a transmitting section instructs a multiplexer of each of computation unit 910A and computation unit 910B to connect to memory bank 920 for reading. In at least some embodiments, the interconnection through data bus 902 shown in FIG. 9 routes output from memory bank 920 to computation unit 910A and computation unit 910B. Therefore, a single transmission from memory bank 920 is received by both computation unit 910A and computation unit 910B. In at least some embodiments, a transmission is received by computation unit 910A at a substantially similar time as the same transmission is received by computation unit 910B. In at least some embodiments, a difference in time of reception of the same transmission between computation unit 910A and computation unit 910B is attributable to a difference in physical distance between memory bank 920 and the respective computation unit. In at least some embodiments, the difference in time of reception is negligible. In at least some embodiments, errors in reception of the transmission due to the difference in time of reception are resolved by reducing clock time of the integrated circuit.

Figure 10A:
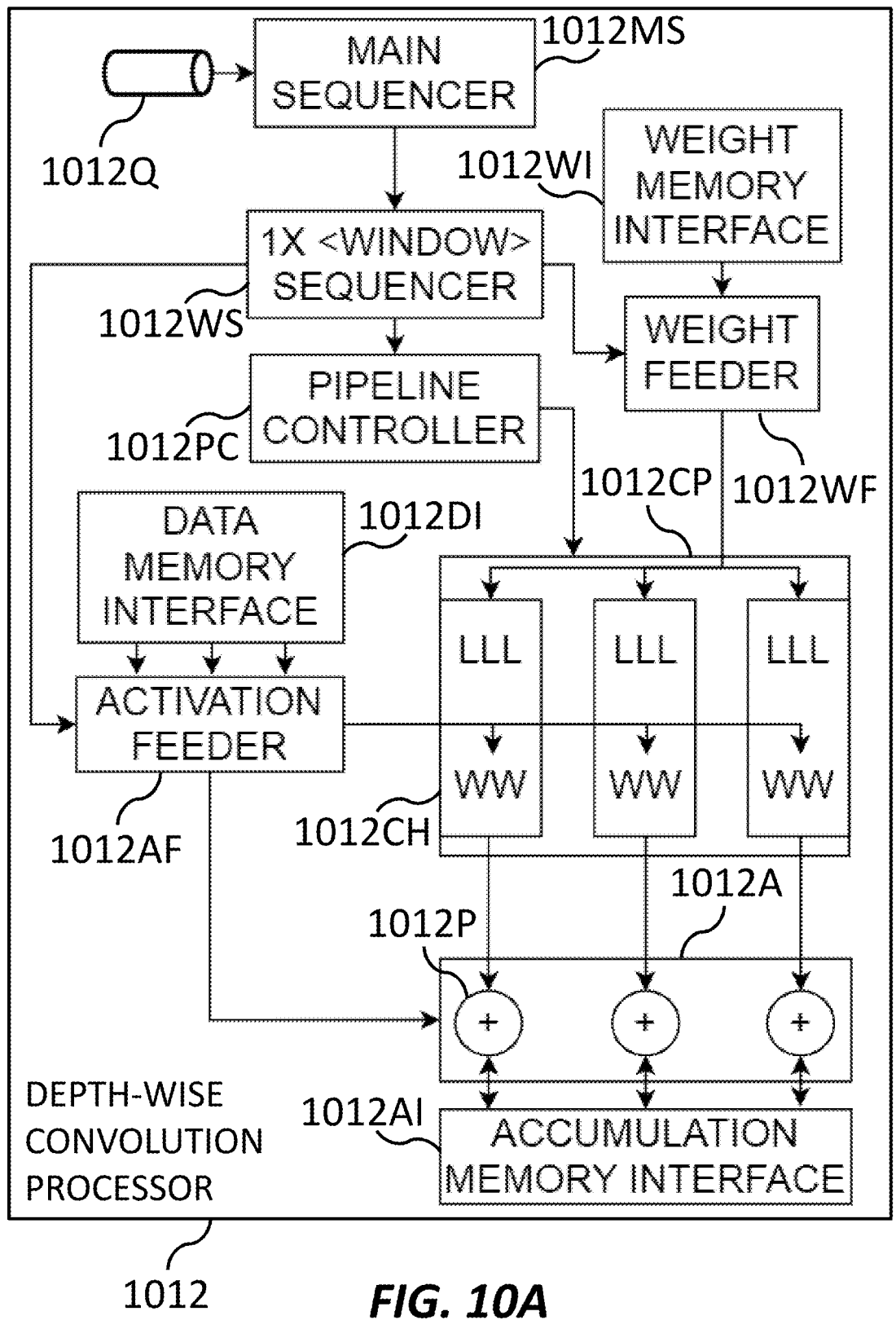
FIG. 10A shows an exemplary configuration of a depth-wise convolution processor, according to an embodiment of the present invention.

FIG. 10A shows an exemplary configuration of a depth-wise convolution processor 1012, according to an embodiment of the present invention. Depth-wise convolution processor 1012 includes a queue 1012Q, a main sequencer 1012MS, a window sequencer 1012WS, an activation feeder 1012AF, a weight feeder 1012WF, a pipeline controller 1012PC, convolution pipelines 1012CP, an external accumulation logic 1012A, and an accumulation memory interface 1012AI.

Queue 1012Q receives and sends instructions. Queue 1012Q may receive instructions from computation controller, such as computation controller 216 of FIG. 2, and send the instructions to main sequencer 1012MS. Queue 1012Q may be a FIFO memory or any other memory suitable for queueing instructions.

Main sequencer 1012MS sequences control parameters for convolution. Main sequencer 1012MS may receive instructions from queue 1012Q, and output instructions to window sequencer 1012WS. Main sequencer 1012MS splits KH×KW convolution into smaller convolutions of size 1×<window> and prepares instructions for activation data and weight values according to order of input regions within the kernel. Wherein <window> refers to an architecture parameter determining line buffer length.

Window sequencer 1012WS sequences control parameters for one 1×<window> convolution. Window sequencer 1012WS may receive instructions from Main sequencer 1012MS, and output a data sequence of activation data according to order of input regions within the kernel to activation feeder 1012AF and a data sequence of weight values according to order of input regions within the kernel to weight feeder 1012WF.

Activation feeder 1012AF feeds activation data accessed from a memory bank through data memory interface 1012D1 to convolution pipelines 1012CP in accordance with the activation data indicated in the data sequence from window sequencer 1012S. Activation feeder 1012AF may read activation data sufficient for 1×<window> computation from the memory bank into a line buffer of the convolution pipelines 1012CP.

Weight feeder 1012WF preloads weight values accessed from a memory bank through weight memory interface 1012WI to convolution pipelines 1012CP in accordance with the weight values indicated in the data sequence from window sequencer 1012S. Weight feeder 1012WF may read weight values sufficient for 1×<window> computation from the weight memory into a weight buffer of the convolution pipelines 1012CP.

Pipeline controller 1012PC controls data transfer operations of convolution pipelines 1012CP. Pipeline controller 1012PC may initiate copying of data from the line buffer into an activation buffer of convolution pipelines 1012CP once the current activation buffer content has been processed. Pipeline controller 1012PC may control convolution computations performed by each channel pipeline 1012CH of convolution pipelines 1012CP, where each channel pipeline 1012CH operates on one channel of the input to the depth-wise convolution layer.

Convolution pipelines 1012CP performs mathematical operations on activation data fed from activation feeder 1012AF and weight values preloaded from weight feeder 1012WF. Convolution pipelines 1012CP is divided into channel pipelines 1012CH, each channel pipeline 1012CH performing mathematical operations for one channel. Combined with activation feeder 1012AF, weight feeder 1012WF, and pipeline controller 1012PC, convolution pipeline logically performs the convolution computations.

External accumulation logic 1012A receives data from convolution pipelines 1012CP, and stores the data in a memory bank through accumulation memory interface 1012AL Accumulation logic 1012A includes an adder 1012P for each channel pipeline 1012CH. Accumulation logic 1012A may be used for point-wise summation of results of 1×<window> convolutions with the contents of the memory bank.

In this embodiment, there are three channels as exemplified by the three window pipelines. However, other embodiments may have a different number of channels. Although possible, this embodiment shows three channels mainly for simplicity. Many embodiments will include at least 16 channels to accommodate practical applications.

Figure 10B:
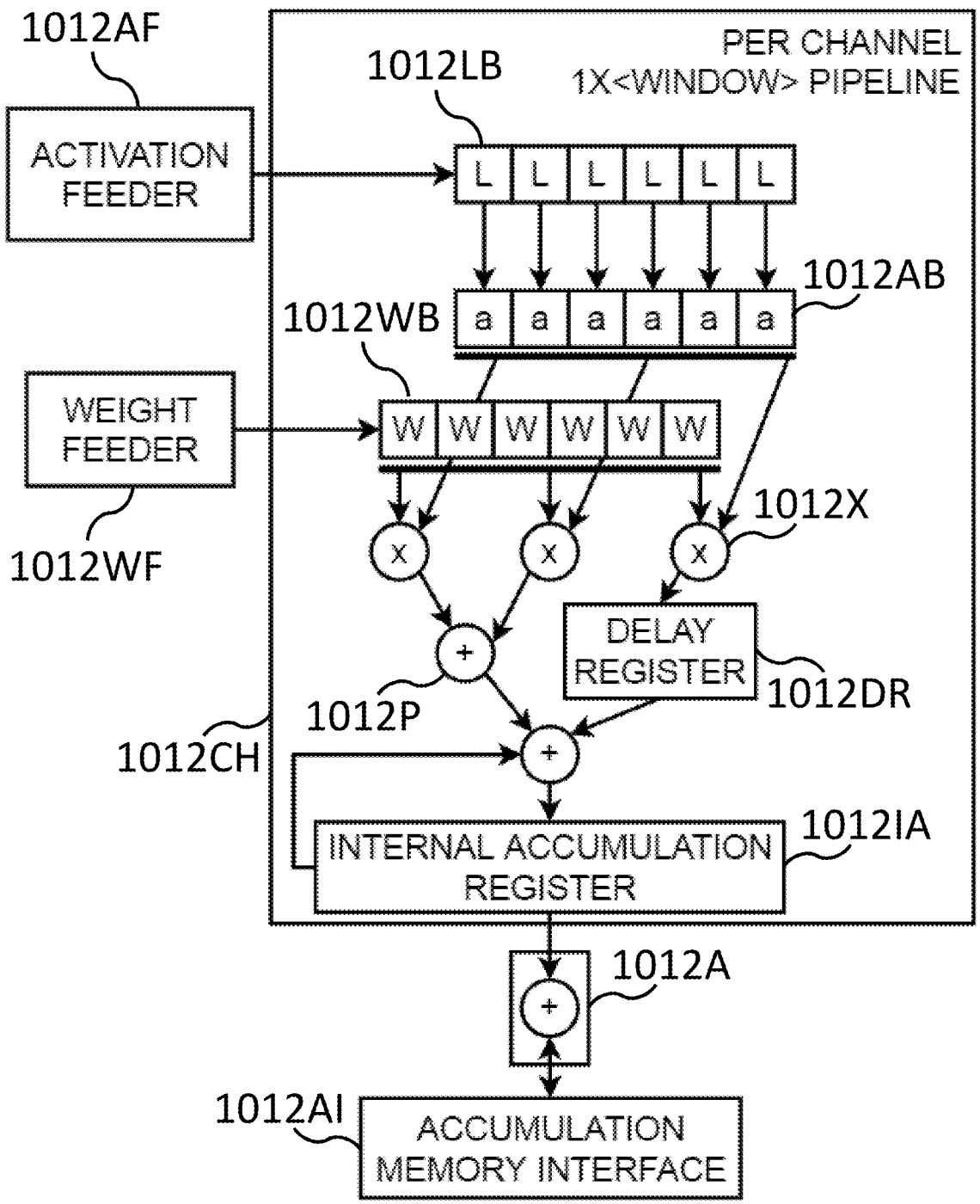
FIG. 10B shows an exemplary configuration of a per-channel pipeline for a depth-wise convolution processor, according to an embodiment of the present invention.

FIG. 10B shows an exemplary configuration of a per-channel pipeline for a depth-wise convolution processor, according to an embodiment of the present invention. Channel pipeline 1012CH includes a line buffer 1012LB, an activation buffer 1012AB, a weight buffer 1012WB, a plurality of multipliers 1012X, a plurality of adders 1012P, a delay register 1012DR, and an internal accumulation register 1012NB.

Line buffer 1012LB stores activation data received from an activation feeder 1012AF. Line buffer 1012LB may include a shift register storing activation data as read by activation feeder 1012AF at one pixel per cycle.

Activation buffer 1012AB stores activation data received from line buffer 1012LB. Activation buffer 1012AB may include a set of registers storing activation data to which the current convolution computation is applied.

Weight buffer 1012WB stores weight values received from weight feeder 1012WF. Weight buffer 1012WB may include a shift register storing weight values to which the current convolution computation is applied.

Multipliers 1012X multiply the activation data from activation buffer 1012AB by the weight values from weight buffer 1012WB. In this embodiment there are three multipliers 1012X, meaning that the degree of parallelism in the width or height dimension of a convolution kernel is three. Adders 1012P, which collectively form an adder tree, then add together the products of the activation data and the weight values. During this process, delay register 1012DR, which is also considered part of the adder tree, balances the adder tree. Internal accumulation register 1012IA assists in the addition by storing partial sums. For example, internal accumulation register 1012IA may be used for accumulation of partial sums when the number of windows of the buffers, which is six in this embodiment, as well as width or height of convolution filter, is more than the degree of parallelism, which is three.

Once the products are all added together as a total sum, the total sum is output to an accumulation logic 1012A, which then stores the data in a memory bank through accumulation memory interface 1012AI.

Figure 11:
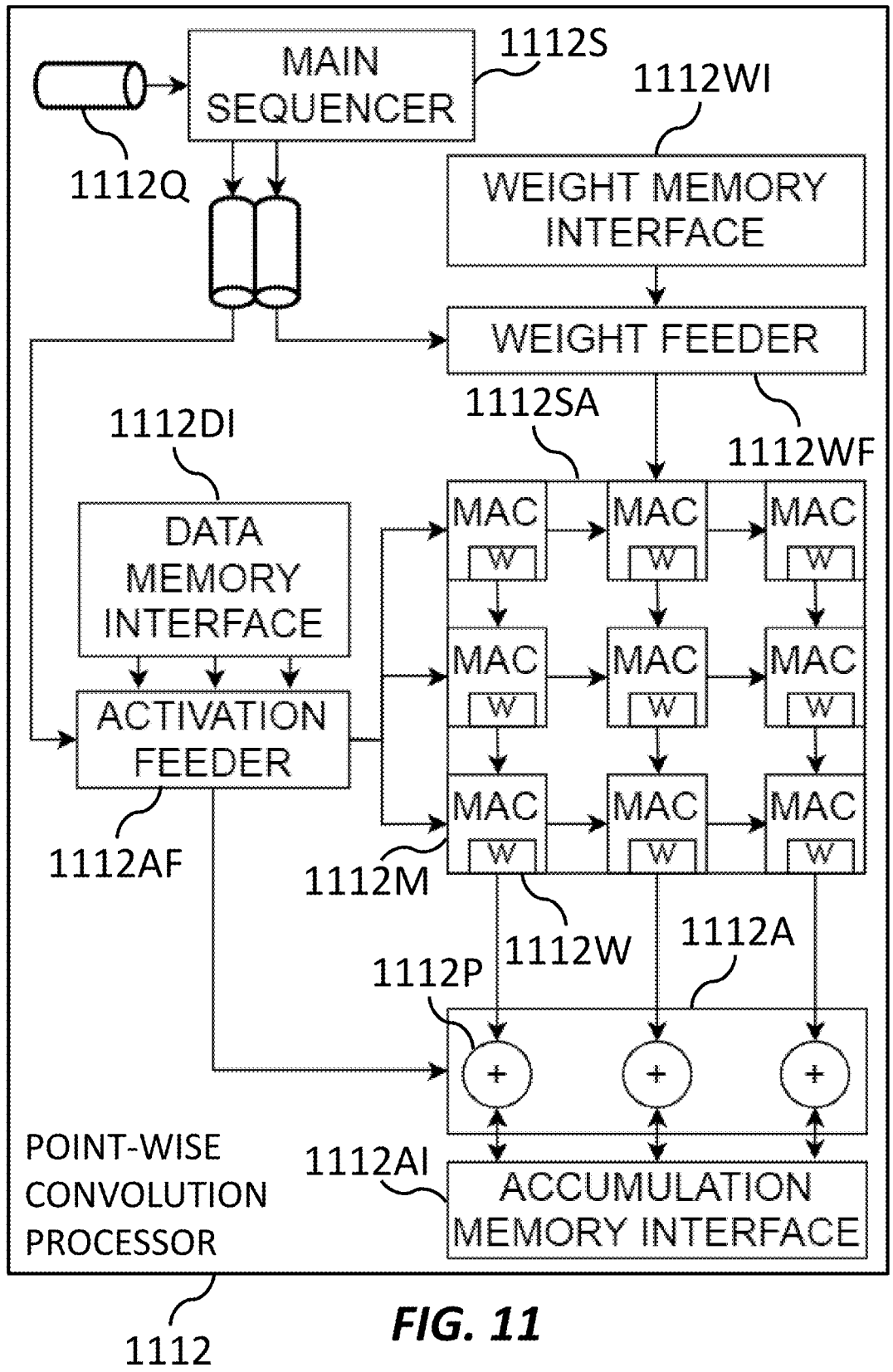
FIG. 11 shows an exemplary configuration of a point-wise convolution processor, according to an embodiment of the present invention.

FIG. 11 shows an exemplary configuration of a point-wise convolution processor, according to an embodiment of the present invention. Point-wise convolution processor 1112 includes queues 1112Q, a main sequencer 1112S, a weight memory interface 1112WI, a weight feeder 1112WF, a weight memory interface 1112WI, an activation feeder 1112AF, a data memory interface 1112DI, a systolic array 1112S, an accumulation logic 1112A, and an accumulation memory interface 1112AI.

Queue 1112Q receives and sends instructions. Queue 1112Q may receive instructions from a computation controller, such as computation controller 216 of FIG. 2, and send the instructions to main sequencer 1112S. Queue 1112Q may be a FIFO memory or any other memory suitable for queueing instructions.

Main sequencer 1112S sequences control parameters for convolution. Main sequencer 1112S may receive instructions from queue 1112Q, and output a control sequence to weight feeder 1112WF and activation feeder 1112AF, each through a queue. In this embodiment, main sequencer 1112S splits KH×KW convolutions into a sequence of 1×1 convolutions, fed as control parameters into weight feeder 1112WF and activation feeder 1112AF.

Weight feeder 1112WF preloads weight values accessed from a memory bank through weight memory interface 1112WI to systolic array 1112SA in accordance with the activation data indicated in the control parameters from main sequencer 1112S.

Activation feeder 1112AF feeds activation data accessed from memory bank through data memory interface 1112DI to systolic array 1112SA in accordance with the activation data indicated in the data sequence from main sequencer 1112S.

Systolic array 1112SA includes a plurality of MAC elements 1112M. Each MAC element 1112M is preloaded with a weight value from weight feeder 1112WF before computation starts, and then receives an activation value from activation feeder 1112F. To allow overlapping of computation and weight value preload, multiple weight buffers may be used. MAC elements 1112M are arranged in an array such that the product of the activation value and the weight output from preceding MAC elements 1112M is input to subsequent MAC elements 1112M. In this embodiment, for every cycle, each MAC element 1112M outputs an accumulation value equal to the value output from its left neighbor MAC element 1112M multiplied by the preloaded weight value 1112W, the product of which is added to the value output from its top neighbor MAC element 1112M. The MAC elements 1112M of the lowest row output their products to accumulation logic 1112A.

Accumulation logic 1112A receives products from systolic array 1112SA, and stores the products in a memory bank. Accumulation logic 1112A includes an adder 1112P for each MAC element 1112M of the lowest row. In this embodiment, if accumulation required by main Sequencer 1112S reads an old value in the memory location to be written, accumulation logic 1112A will overwrite it by sum with the new value. Otherwise, accumulation logic 1112A writes the new value as is.

Point-wise convolution module 1112 may be useful in performing point-wise convolution by splitting a single KH×KW convolution into multiple KH×KW 1×1 convolutions. For example, in a region of a memory bank corresponding to four different 1×1 convolutions, 2×2 convolutions may be substituted. Point-wise convolution module 1112 may compute each 1×1 convolution as a dot product of the matrix of activation values in the MAC elements, and the matrix of weight values in the MAC elements, and then sum the results of the 1×1 convolutions.

The convolution processors of FIGS. 10A, 10B, and 11 are implemented in at least some embodiments configured to perform inference of convolution networks. Other processors are used in at least some other embodiments configured to perform inference of other types of neural networks, including other types of deep networks.

At least some embodiments are described with reference to flowcharts and block diagrams whose blocks represent (1) steps of processes in which operations are performed or (2) sections of a controller responsible for performing operations. In at least some embodiments, certain steps and sections are implemented by dedicated circuitry, programmable circuitry supplied with computer-readable instructions stored on computer-readable media, and/or processors supplied with computer-readable instructions stored on computer-readable media. In at least some embodiments, dedicated circuitry includes digital and/or analog hardware circuits and include integrated circuits (IC) and/or discrete circuits. In at least some embodiments, programmable circuitry includes reconfigurable hardware circuits comprising logical AND, OR, XOR, NAND, NOR, and other logical operations, flip-flops, registers, memory elements, etc., such as field-programmable gate arrays (FPGA), programmable logic arrays (PLA), etc.

In at least some embodiments, the computer readable storage medium includes a tangible device that is able to retain and store instructions for use by an instruction execution device. In some embodiments, the computer readable storage medium includes, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

In at least some embodiments, computer readable program instructions described herein are downloadable to respective computing/processing devices from a computer readable storage medium or to an external computer or external storage device via a network, for example, the Internet, a local area network, a wide area network and/or a wireless network. In at least some embodiments, the network includes copper transmission cables, optical transmission fibers, wireless transmission, routers, firewalls, switches, gateway computers and/or edge servers. In at least some embodiments, a network adapter card or network interface in each computing/processing device receives computer readable program instructions from the network and forwards the computer readable program instructions for storage in a computer readable storage medium within the respective computing/processing device.

In at least some embodiments, computer readable program instructions for carrying out operations described above are assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. In at least some embodiments, the computer readable program instructions are executed entirely on the user's computer, partly on the user's computer, as a stand-alone software package, partly on the user's computer and partly on a remote computer or entirely on the remote computer or server. In at least some embodiments, in the latter scenario, the remote computer is connected to the user's computer through any type of network, including a local area network (LAN) or a wide area network (WAN), or the connection is made to an external computer (for example, through the Internet using an Internet Service Provider). In at least some embodiments, electronic circuitry including, for example, programmable logic circuitry, field-programmable gate arrays (FPGA), or programmable logic arrays (PLA) execute the computer readable program instructions by utilizing state information of the computer readable program instructions to individualize the electronic circuitry, in order to perform aspects of the present invention.

While embodiments of the present invention have been described, the technical scope of any subject matter claimed is not limited to the above described embodiments. Persons skilled in the art would understand that various alterations and improvements to the above-described embodiments are possible. Persons skill in the art would also understand from the scope of the claims that the embodiments added with such alterations or improvements are included in the technical scope of the invention.

The operations, procedures, steps, and stages of each process performed by an apparatus, system, program, and method shown in the claims, embodiments, or diagrams are able to be performed in any order as long as the order is not indicated by "prior to," "before," or the like and as long as the output from a previous process is not used in a later process. Even if the process flow is described using phrases such as "first" or "next" in the claims, embodiments, or diagrams, such a description does not necessarily mean that the processes must be performed in the described order.

Neural network hardware acceleration data parallelism is performed by an integrated circuit including a plurality of memory banks, each memory bank among the plurality of memory banks configured to store values and to transmit stored values, a plurality of computation units, each computation unit among the plurality of computation units including a processor including circuitry configured to perform a mathematical operation on an input data value and a weight value to produce a resultant data value, and a computation controller configured to cause a value transmission to be received by more than one computation unit or bank.

The foregoing outlines features of several embodiments so that those skilled in the art would better understand the aspects of the present disclosure. Those skilled in the art should appreciate that this disclosure is readily usable as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that various changes, substitutions, and alterations herein are possible without departing from the spirit and scope of the present disclosure.

What is claimed is:

1. An integrated circuit comprising:
   a plurality of memory banks, each memory bank among the plurality of memory banks configured to store values and to transmit stored values;
   a plurality of computation units, each computation unit among the plurality of computation units including:
   a processor including circuitry configured to perform a mathematical operation on an input data value and a weight value to produce a resultant data value, and
   a computation controller configured to:
      receive the input data value from any of the plurality of memory banks,
      receive the weight value from any of the plurality of memory banks,
      cause the processor to perform the mathematical operation, and
      transmit the resultant data value to at least two memory banks among the plurality of memory banks, such that a single transmission of the resultant data value is received by the at least two memory banks at negligibly different times, wherein differences between the negligibly different times are attributable to differences in physical distances between the computation unit and respective ones of the at least two memory banks;
   a plurality of interconnects connecting each computation unit among the plurality of computation units to each memory bank among the plurality of memory banks;
   from the single computation unit to the at least two memory banks;
   wherein the computation controller of a first computation unit among the plurality of computation units is further configured to:
      synchronize a second computation unit among the plurality of computation units to receive one of the input data value or the weight value, and
      read the one of the input data value or the weight value from the memory bank storing the one of the input data value or the weight value among the plurality of memory banks, such that the memory bank storing the one of the input data value or the weight value makes a single transmission of the one of the input data value or the weight value to be read by the computation controller and the second computation unit at two negligibly different times, wherein a difference between the two negligibly different times is attributable to a difference in a physical distance between the computation controller and the memory bank storing the one of the input data value or the weight value, and a physical distance between the second computation unit and the memory bank storing the one of the input data value or the weight value,
   wherein the plurality of interconnects route output from the memory bank storing the one of the input data value or the weight value among the plurality of memory banks to the first computation unit and the second computation unit to facilitate the single transmission of the one of the input data value or the weight value from the memory bank storing the one of the input data value or the weight value among the plurality of memory banks to the first computation unit and the second computation unit.

2. The integrated circuit of claim 1, further comprising a controller configured to receive instructions to perform neural network inference.

3. The integrated circuit of claim 1, wherein the computation controller is further configured to set a lock on each of the at least two memory banks.

4. The integrated circuit of claim 1, wherein the computation controller is further configured to apply a bank offset for one or more of the at least two memory banks.

5. The integrated circuit of claim 1, wherein the computation controller is further configured to release a lock on each of the at least two memory banks.

6. The integrated circuit of claim 1, wherein the processor is configured to perform point-wise convolution or depth-wise convolution.

7. The integrated circuit of claim 1, wherein each memory bank among the plurality of memory banks is configured to store values received through a corresponding bank multiplexer.

8. The integrated circuit of claim 7, wherein the bank multiplexer is configurable to connect to a computation unit among the plurality of computation units or an external memory.

9. The integrated circuit of claim 1, wherein each computation unit among the plurality of computation units further includes a computation multiplexer configurable to connect to one of the plurality of memory banks.

10. A method comprising:
    retrieving, by a first computation unit among a plurality of computation units included in an integrated circuit configured to perform neural network inference, an input data value from a memory bank storing the input data value among a plurality of memory banks included in the integrated circuit;
    retrieving, by the first computation unit, a weight value from a memory bank storing the weight value among the plurality of memory banks;
    performing, by the first computation unit, a mathematical operation on the input data value and the weight value to produce a resultant data value; and
    transmitting, by the first computation unit, the resultant data value to at least two memory banks among the plurality of memory banks, such that the first computation unit makes a single transmission of the resultant data value, which is received by the at least two memory banks at negligibly different times, wherein differences between the negligibly different times are attributable to differences in physical distances between the computation unit and respective ones of the at least two memory banks;

wherein a plurality of interconnects route output from the first computation unit to the at least two memory banks to facilitate the single transmission of the resultant data value from the first computation unit to the at least two memory banks;

wherein retrieving one of the input data value or the weight value includes synchronizing a second computation unit to read the one of the input data value or the weight value, and reading, by the first computation unit, the one of the input data value or the weight value from the memory bank storing the one of the input data value or the weight value among the plurality of memory banks, such that the memory bank storing the one of the input data value or the weight value makes a single transmission of the one of the input data value or the weight value, which is read by the first computation unit and the second computation unit at two negligibly different times, wherein a difference between the two negligibly different times is attributable to a difference in a physical distance between the computation controller and the memory bank storing the one of the input data value or the weight value, and a physical distance between the second computation unit and the memory bank storing the one of the input data value or the weight value, wherein a plurality of interconnects route output from the memory bank storing the one of the input data value or the weight value among the plurality of memory banks to the first computation unit and the second computation unit to facilitate the single transmission of the one of the input data value or the weight value from the memory bank storing the one of the input data value or the weight value among the plurality of memory banks to the first computation unit and the second computation unit.

11. The method of claim 10, further comprising receiving, by the integrated circuit, an instruction to perform inference of a neural network.

12. The method of claim 10, wherein the retrieving the input data value includes configuring a first multiplexer corresponding to the first computation unit to connect to the memory bank storing the input data value, and retrieving the weight value includes configuring the first multiplexer to connect to the memory bank storing the weight value.

13. The method of claim 10, wherein transmitting the resultant value includes setting a lock on each of the at least two memory banks.

14. The method of claim 10, wherein transmitting the resultant value includes applying a bank offset for one or more of the at least two memory banks.

15. The method of claim 10, wherein transmitting the resultant value includes releasing a lock on each of the at least two memory banks.

16. An integrated circuit comprising:
a plurality of memory banks, each memory bank among the plurality of memory banks configured to store values and to transmit stored values; and
a plurality of computation units, each computation unit among the plurality of computation units including:
a processor including circuitry configured to perform a mathematical operation on an input data value and a weight value to produce a resultant data value, and a computation controller;
a plurality of interconnects connecting each computation unit among the plurality of computation units to each memory bank among the plurality of memory banks;
wherein the computation controller of a first computation unit among the plurality of computation units is configured to synchronize a second computation unit among the plurality of computation units to receive one of the input data value or the weight value, and read the one of the input data value or the weight value from the memory bank storing the one of the input data value or the weight value among the plurality of memory banks, such that the memory bank storing the one of the input data value or the weight value makes a single transmission of the one of the input data value or the weight value to be read by the computation controller and the second computation unit at negligibly different times, wherein differences between the negligibly different times are attributable to differences in physical distances between the computation unit and respective ones of the at least two memory banks;
wherein the plurality of interconnects route output from the memory bank storing the one of the input data value or the weight value among the plurality of memory banks to the first computation unit and the second computation unit to facilitate the single transmission of the one of the input data value or the weight value from the memory bank storing the one of the input data value or the weight value among the plurality of memory banks to the first computation unit and the second computation unit.

17. The integrated circuit of claim 16, wherein the computation controller is further configured to receive the input data value from any of the plurality of memory banks, receive the weight value from any of the plurality of memory banks, cause the processor to perform the mathematical operation, and
transmit the resultant data value to at least two memory banks among the plurality of memory banks, such that a single transmission of the resultant data value is received by the at least two memory banks at two negligibly different times, wherein a difference between the two negligibly different times is attributable to a difference in a physical distance between the computation controller and the memory bank storing the one of the input data value or the weight value, and a physical distance between the second computation unit and the memory bank storing the one of the input data value or the weight value.

18. The integrated circuit of claim 16, wherein the computation controller is further configured to set a lock on each of the at least two memory banks.

* * * * *